(12) United States Patent
Teague et al.

(10) Patent No.: US 9,161,294 B2
(45) Date of Patent: Oct. 13, 2015

(54) USING MOTION TO OPTIMIZE PLACE OF RELEVANCE OPERATIONS

(71) Applicant: QUALCOMM Incorporated, San Diego, CA (US)

(72) Inventors: Edward Harrison Teague, San Diego, CA (US); Jinwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 13/800,699

(22) Filed: Mar. 13, 2013

(65) Prior Publication Data

US 2014/0274042 A1    Sep. 18, 2014

(51) Int. Cl.
  H04W 4/00    (2009.01)
  H04W 48/16   (2009.01)
  H04W 8/02    (2009.01)
  H04W 52/02   (2009.01)

(52) U.S. Cl.
  CPC ............... *H04W 48/16* (2013.01); *H04W 8/02* (2013.01); *H04W 52/0254* (2013.01)

(58) Field of Classification Search
  CPC ..... H04W 48/18; H04W 8/005; H04W 4/028; H04W 48/20; H04W 4/027; H04W 52/0245
  USPC ............. 455/456.1–457, 436–444, 41.1–41.3
  See application file for complete search history.

(56) References Cited

U.S. PATENT DOCUMENTS

| | | | |
|---|---|---|---|
| 6,208,861 B1 | 3/2001 | Suzuki | |
| 8,670,425 B1 * | 3/2014 | Xue et al. | 370/338 |
| 2004/0192296 A1 | 9/2004 | Ohmori | |
| 2005/0181734 A1 * | 8/2005 | Coutts et al. | 455/67.16 |
| 2007/0091847 A1 | 4/2007 | Lee | |
| 2007/0184835 A1 | 8/2007 | Bitran et al. | |
| 2008/0112346 A1 | 5/2008 | Tolpin et al. | |
| 2008/0161072 A1 | 7/2008 | Lide et al. | |
| 2008/0219208 A1 * | 9/2008 | Adams et al. | 370/328 |
| 2009/0073871 A1 | 3/2009 | Ko et al. | |
| 2009/0098873 A1 * | 4/2009 | Gogic | 455/436 |
| 2009/0103503 A1 | 4/2009 | Chhabra | |
| 2009/0131081 A1 | 5/2009 | Abdel-Kader et al. | |
| 2009/0164813 A1 * | 6/2009 | Tu et al. | 713/320 |
| 2009/0312014 A1 | 12/2009 | Su et al. | |
| 2010/0009643 A1 * | 1/2010 | Haartsen | 455/127.5 |
| 2010/0172274 A1 | 7/2010 | Wu et al. | |
| 2010/0248773 A1 | 9/2010 | Rosay et al. | |
| 2011/0299422 A1 | 12/2011 | Kim et al. | |
| 2011/0300875 A1 | 12/2011 | Kim et al. | |
| 2012/0028635 A1 * | 2/2012 | Borg et al. | 455/423 |
| 2013/0130694 A1 * | 5/2013 | Kherani et al. | 455/437 |
| 2013/0182603 A1 * | 7/2013 | Twell | 370/252 |
| 2013/0331087 A1 | 12/2013 | Shoemaker et al. | |
| 2014/0065974 A1 | 3/2014 | Sane | |
| 2014/0274041 A1 | 9/2014 | Lee et al. | |
| 2014/0274044 A1 | 9/2014 | Lee et al. | |

FOREIGN PATENT DOCUMENTS

| | | | |
|---|---|---|---|
| EP | 2203020 A1 | 6/2010 | |
| WO | 2009085893 A2 | 7/2009 | |

* cited by examiner

*Primary Examiner* — Daniel Lai
(74) *Attorney, Agent, or Firm* — Muncy, Geissler, Olds & Lowe, P.C.

(57) ABSTRACT

The disclosure is directed to using a change in motion to improve place of relevance (PoR) detection. An aspect determines whether or not a motion state of a mobile device has changed to a new motion state, determines whether or not to trigger the mobile device to scan for available local wireless networks if the motion state has changed, and identifies a PoR based on the scanning.

38 Claims, 8 Drawing Sheets

FIG. 8

USING MOTION TO OPTIMIZE PLACE OF RELEVANCE OPERATIONS

REFERENCE TO CO-PENDING APPLICATIONS FOR PATENT

The present Application for Patent is related to the following co-pending U.S. patent application Ser. No. 13/800,431, entitled, "USING MOTION TO IMPROVE LOCAL WIRELESS NETWORK CONNECTIVITY," by Lee and Teague, filed concurrently herewith, assigned to the assignee hereof, and expressly incorporated herein by reference.

BACKGROUND OF THE INVENTION

1. Field of the Invention

The disclosure is directed to using motion to optimize place of relevance (PoR) operations.

2. Description of the Related Art

Mobile devices, such as cell phones, smart phones, tablet computers, laptops, personal digital assistants (PDAs), etc., are often capable of connecting to local wireless networks, such as wireless local area networks (WLANs), WiFi networks, Bluetooth networks, and the like. Such networks are often used to provide data connectivity for these mobile devices.

A place of relevance (PoR) is a location that is often visited by a user. A PoR is typically associated with a particular local wireless network. Accordingly, a mobile device can identify a PoR and detect subsequent visits by monitoring local wireless network signals. The mobile device can continuously scan for available local wireless networks and notify the user when it detects the local wireless network corresponding to the PoR.

Currently, mobile devices simply perform periodic scans. The rate of scanning is a tradeoff between power consumption and the delay of establishing a connection. These scans can require significant power, and thus there is an opportunity to use motion information to improve the power performance of the connectivity management.

SUMMARY

The disclosure is directed to using a change in motion to improve PoR detection. A method for using a change in motion to improve PoR detection includes determining whether or not a motion state of a mobile device has changed to a new motion state, determining whether or not to trigger the mobile device to scan for available local wireless networks if the motion state has changed, and identifying a PoR based on the scanning.

An apparatus for using a change in motion to improve PoR detection includes logic configured to determine whether or not a motion state of a mobile device has changed to a new motion state, logic configured to determine whether or not to trigger the mobile device to scan for available local wireless networks if the motion state has changed, and logic configured to identify a PoR based on the scanning.

An apparatus for using a change in motion to improve PoR detection includes means for determining whether or not a motion state of a mobile device has changed to a new motion state, means for determining whether or not to trigger the mobile device to scan for available local wireless networks if the motion state has changed, and means for identifying a PoR based on the scanning.

A non-transitory computer-readable medium for using a change in motion to improve PoR detection includes at least one instruction to determine whether or not a motion state of a mobile device has changed to a new motion state, at least one instruction to determine whether or not to trigger the mobile device to scan for available local wireless networks if the motion state has changed, and at least one instruction to identify a PoR based on the scanning.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
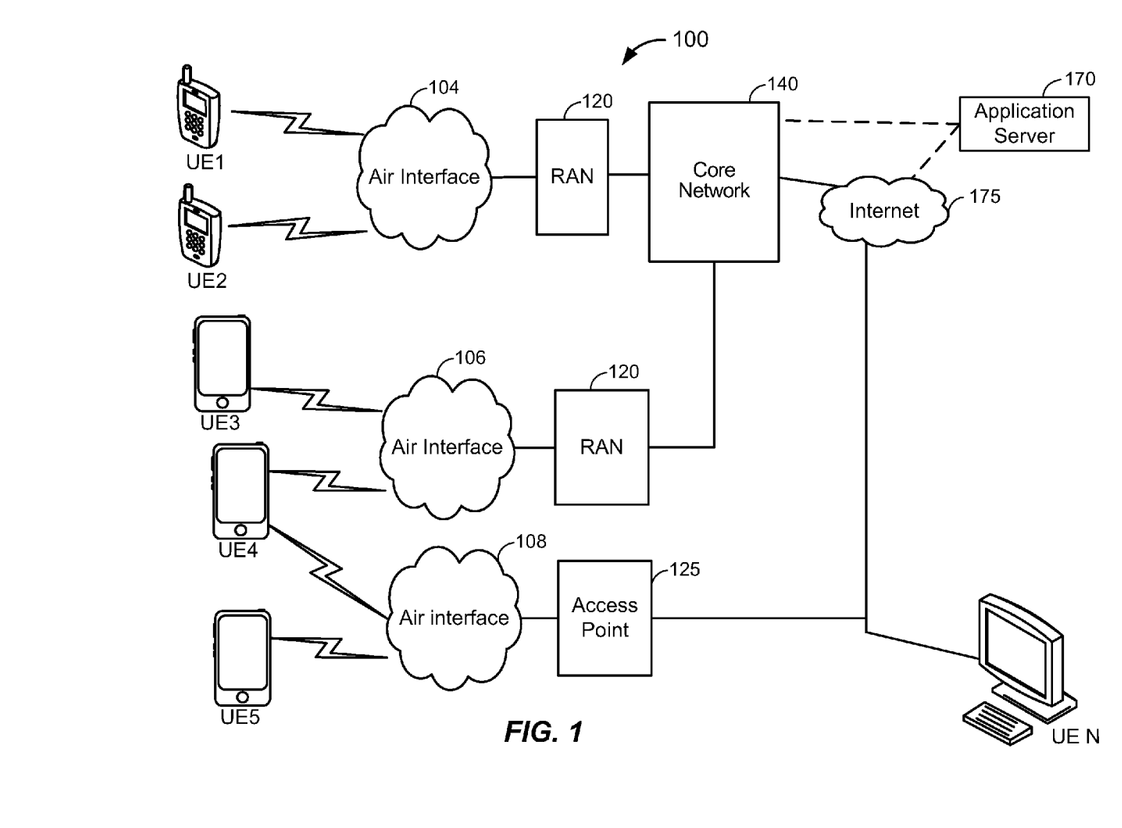
FIG. 1 illustrates a high-level system architecture of a wireless communications system in accordance with an aspect of the disclosure.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
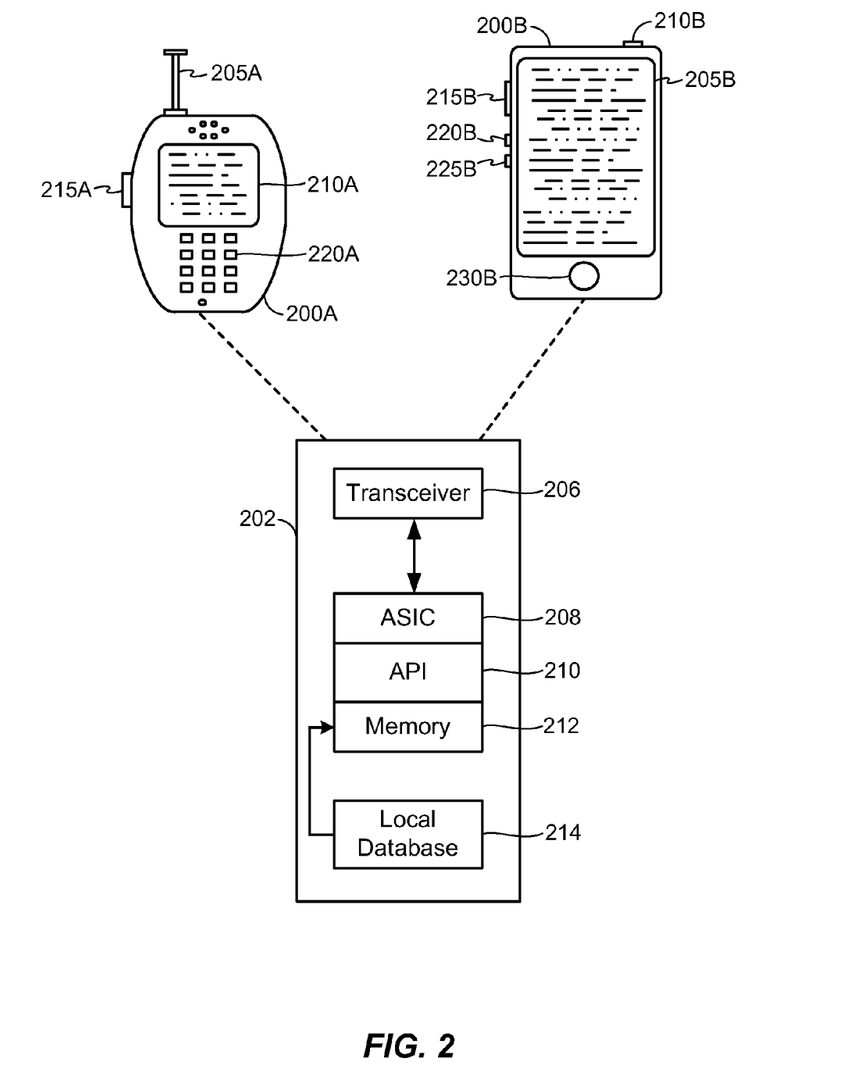
FIG. 2 illustrates examples of user equipments (UEs) in accordance with aspects of the disclosure.

FIG. 2 illustrates examples of UEs in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 3:
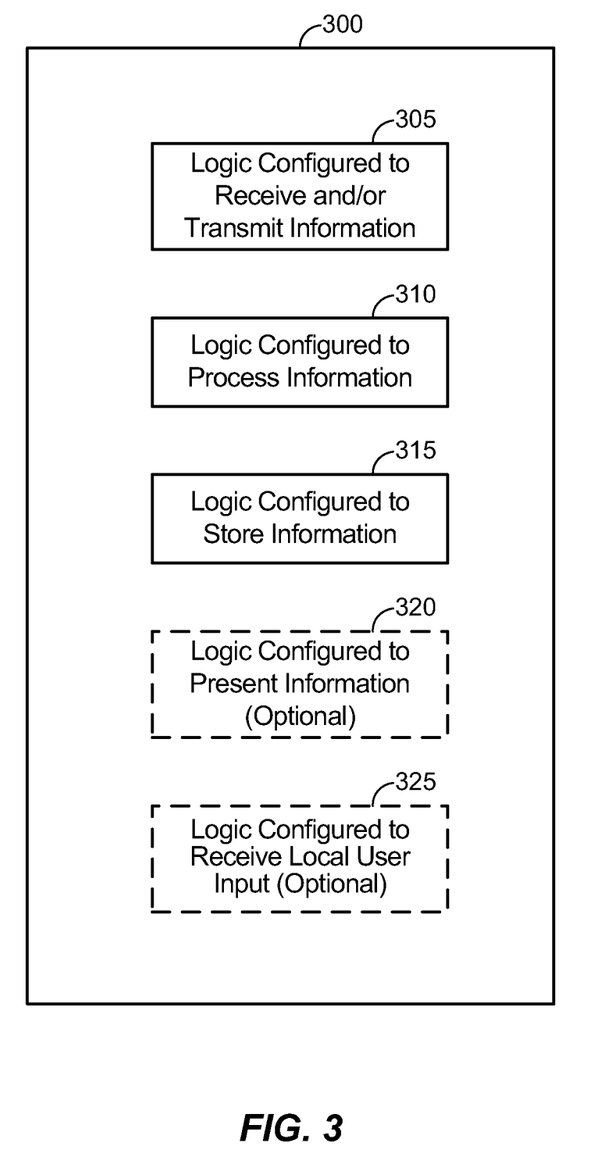
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can include logic configured to determine whether or not a motion state of the communication device 300 has changed to a new motion state, logic configured to determine whether or not to trigger the communication device 300 to scan for available local wireless networks if the motion state has changed, and logic configured to identify a PoR based on the scanning. The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the logic configured to process information 310 can include logic configured to determine whether or not a motion state of the communication device 300 has changed to a new motion state, logic configured to determine whether or not to trigger the communication device 300 to scan for available local wireless networks if the motion state has changed, and logic configured to identify a PoR based on the scanning. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Mobile devices, such as cell phones, smart phones, tablet computers, laptops, personal digital assistants (PDAs), etc., are often capable of connecting to local wireless networks, such as wireless local area networks (WLANs), WiFi networks, Bluetooth networks, and the like. Such networks are often used to provide data connectivity for these mobile devices.

A place of relevance (PoR) is a location that is often visited by a user. A PoR is typically associated with a particular local wireless network or group of local wireless networks. Accordingly, a mobile device can identify a PoR and detect subsequent visits by monitoring local wireless network signals. The mobile device can continuously scan for available local wireless networks and notify the user when it detects the one or more local wireless networks corresponding to the PoR.

Currently, mobile devices simply perform periodic scans. The rate of scanning is a tradeoff between power consumption and the delay of establishing a connection. These scans can require significant power, as shown in FIG. 4.

Figure 4:
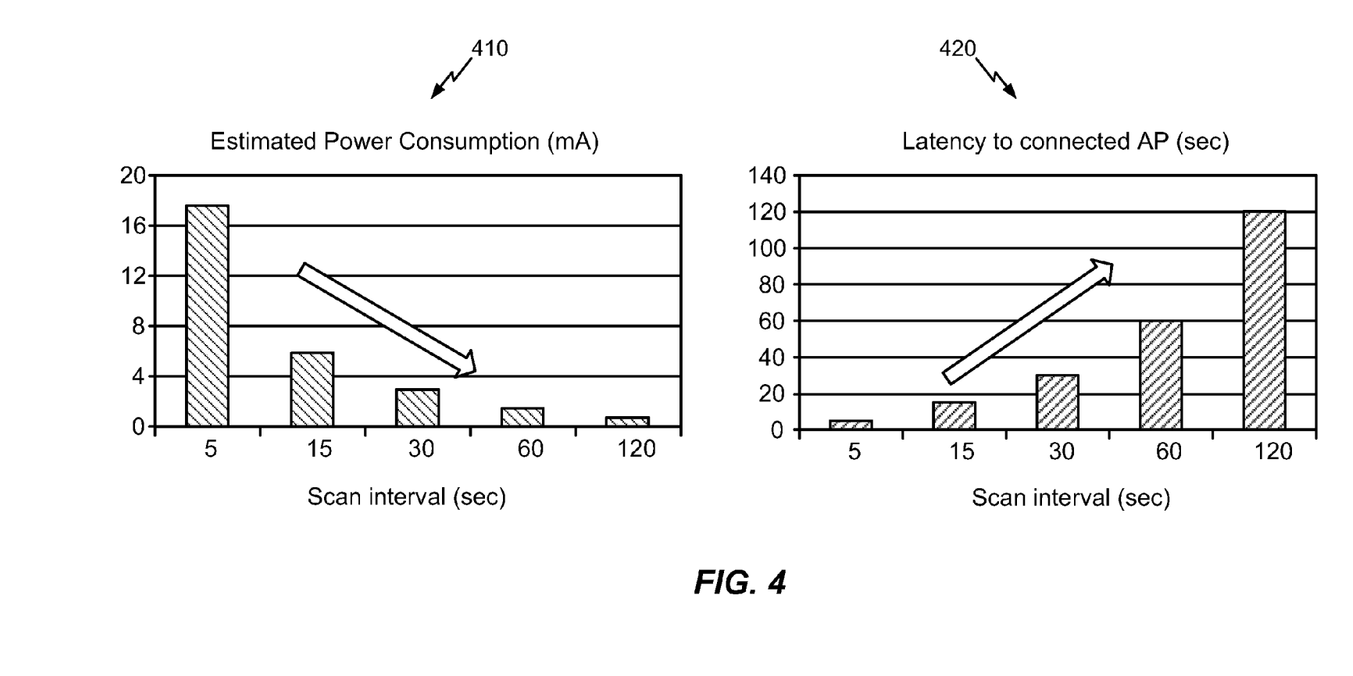
FIG. 4 illustrates exemplary tradeoffs between power and latency.

FIG. 4 illustrates exemplary tradeoffs between power and latency. Graph 410 illustrates the power consumption (in mA) for scan intervals of 5, 15 30, 60, and 120 seconds. Graph 420 illustrates the latency to connect to an access point (in seconds) for scan intervals of 5, 15 30, 60, and 120 seconds. As can be seen, the shorter the scan interval, the higher the power consumption. However, the shorter the scan interval, the shorter the connection latency.

As shown, frequent scans can require significant power. However, there is an opportunity to use motion information to improve the power performance of the connectivity management. For example, there is no need to continuously scan for local wireless networks when the mobile device is stationary. All that is needed is an initial scan to identify available local wireless networks at that location. Additionally, there is no need to continuously scan for local wireless networks when the mobile device is moving because a PoR is a stationary location, and thus network scans while the mobile device is moving do not contribute to identifying a PoR.

Accordingly, a mobile device can reduce power consumption by performing scans only when the motion state of the mobile device changes from a non-stationary motion state to a stationary motion state. The motion state of the mobile device and changes from one state to another can be detected by the mobile device's accelerometer, which requires very little power. This reduces a large number of superfluous scans, which dramatically decreases power consumption.

To determine whether the mobile device is stationary or non-stationary, a motion state classifier can classify the motion of the mobile device into seven motion states: walk, run, sit, stand, fiddle, in-transit, and null. "Fiddle" means the user is holding the mobile device. "In-transit" means the mobile device is travelling in any vehicle, such as an automobile, a train, a plane, etc. "Null" means that the motion classifier cannot reach a level of confidence in the motion classification necessary to report a motion state.

These seven fine-grained motion states can be remapped to two coarse-grained motion states: stationary (sit, stand, fiddle, null) and non-stationary (walk, run, in-transit). These coarse-grained motion states can be used to identify two motion state change events—the mobile device can go from stationary to non-stationary or from non-stationary to stationary.

There are several types of motion state change algorithms that can be used to determine the motion state of the mobile device. For example, the instant change detection (ICD) algorithm monitors consecutive motion states and detects any transition between stationary and in-transit (the algorithm ignores the null output). As another example, the cumulative sum control chart (CUSUM)-based change detection (CCD) algorithm accumulates and detects change upon crossing a maximum divided by two (e.g. the maximum may be 10 seconds). As yet another example, the CUSUM-based and collapse change detection (CCCD) algorithm detects change events within two minutes. This works because many of the CUSUM-based change events are generated within two minutes. The algorithm collapses, or combines, change events if they are generated within two minutes.

Figure 5:
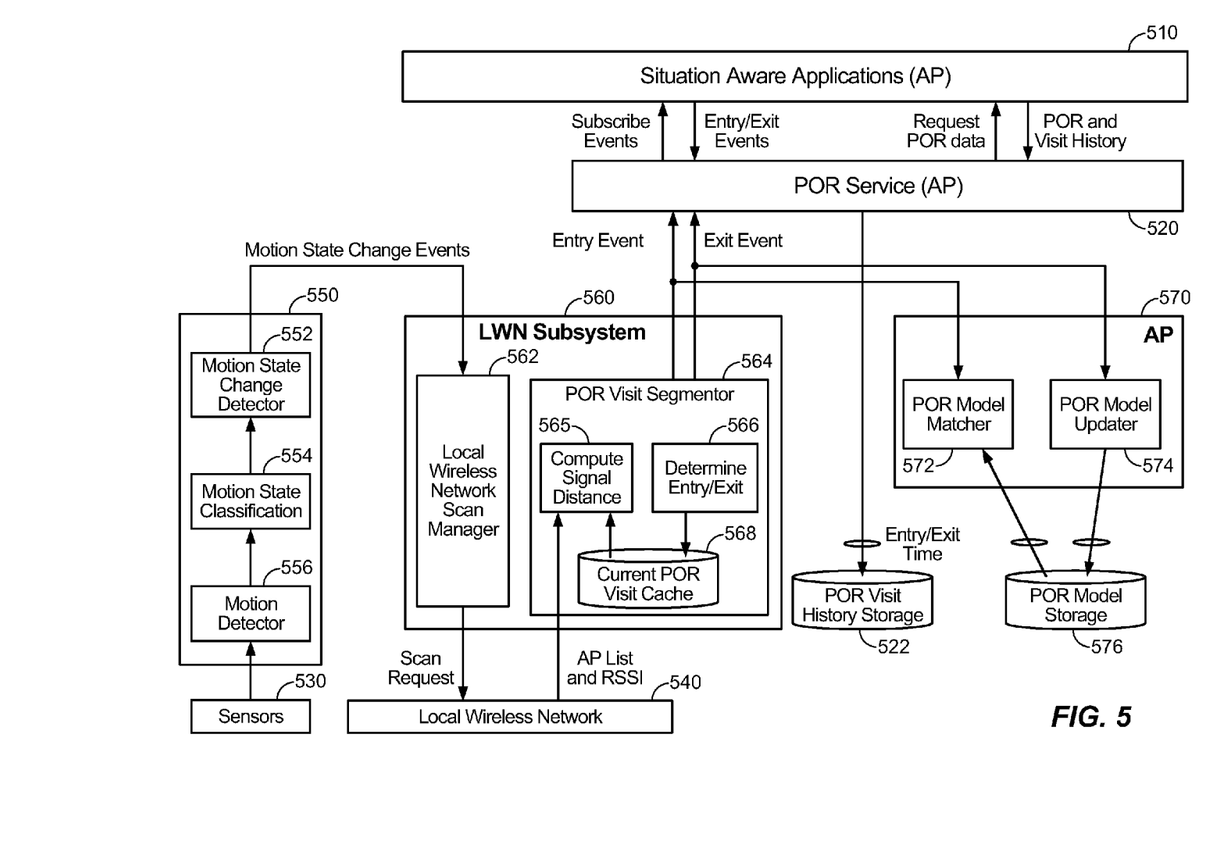
FIG. 5 illustrates an exemplary architecture for using motion to optimize PoR operations according to at least one aspect.

FIG. 5 illustrates an exemplary architecture for using motion to optimize PoR operations according to at least one aspect. The architecture includes one or more situation aware applications 510, a PoR service 520, one or more sensors 530, which can include an accelerometer, a local wireless network access subsystem 540, a motion state manager 550, a local wireless network (denoted "LWN") subsystem 560, and an application processor 570.

At the motion state manager 550, a motion detector 556 reads motion data from the sensor(s) 530. The motion detector 556 can be any appropriate motion detector. A motion state classifier 554 receives data representing the motion from the motion detector 556. The motion state classifier 554 can classify the motion as one of, for example, walk, run, sit, stand, absolute rest, fiddle, in-transit, or null. A motion state change detector 552 receives the classified motion from the motion state classifier 554. The motion state change detector 552 can detect a motion state change from a stationary motion state to a non-stationary motion state, or vice versa, and can generate a corresponding motion state change event.

A local wireless network scan manager 562 in the LWN subsystem 560 receives motion state change event notifications from the motion state change detector 552. In response, the local wireless network scan manager 562 sends a message to the local wireless network access subsystem 540 requesting that it perform one or more scans for available local wireless networks. For example, the local wireless network scan manager 562 may request that the local wireless network access subsystem 540 perform five back-to-back scans for available networks.

A compute signal distance mechanism 565 within a PoR visit segmentor 564 receives a list of available local wireless networks and their corresponding received signal strength indications (RSSIs) from the local wireless network access subsystem 540. The local wireless network access subsystem 540 generates the list of available networks and their RSSIs in response to the request received from the scan manager 562. A determine entry/exit mechanism 566 in the PoR visit segmentor 564 stores the current PoR in the current PoR visit cache 568. The compute signal distance mechanism 565 can read the current PoR from the current PoR visit cache 568.

The PoR visit segmentor 564 can send entry and exit events to the PoR service 520. The PoR visit segmentor 564 can also send entry events to a PoR model matcher 572 and exit events to a PoR model updater 574, both contained in the AP 570. The PoR model updater 574 updates PoR models in the PoR model storage 576 with the exit event. The PoR model matcher 572 reads PoR model data from the PoR model storage 576.

The PoR service 520, upon receiving entry or exit events, stores the entry or exit time in a PoR visit history storage 522, which may be, for example, flash memory. The PoR service 520 can receive subscribe events, or subscription requests, from the one or more situation aware applications 510, and in response, can send entry and exit events to the one or more situation aware applications 510. The PoR service 520 can also receive requests for PoR data from the one or more situation aware applications 510, and in response, can send the PoR data and the PoR visit history to the one or more situation aware applications 510.

There may be various interfaces between the sensor subsystem 530 and the LWN subsystem 560. For example, there can be a subscribe to motion state change events interface that specifies receiver, time, and distance parameters. The receiver parameter may be the identity of the event receiver to handle motion state change events. The motion state change events may include the type of event and the associated timestamp. The time parameter may be the minimum time latency for event detection, and can be provided in milliseconds. The distance parameter may be the minimum movement distance for event detection, and can be provided in meters. An unsubscribe to motion state change events interface can specify just the receiver parameter.

There also may be various interfaces between the LWN subsystem 560 and the PoR services 520. For example, there can be a subscribe to entry and exit events interface that specifies receiver and time parameters. The receiver parameter may be the identity of the event receiver to handle PoR visit events. The visit events can include the type of event, either entry or exit, the associated timestamp, and the PoR model, or fingerprint. The PoR model can include the basic service set identifier (BSSID) of any access points at the PoR, the average RSSI at the PoR, and a count of the resp. at the PoR. The time parameter may be the minimum time latency for event detection, and can be provided in milliseconds. An unsubscribe to entry and exit events interface can specify just the receiver parameter.

Figure 6:
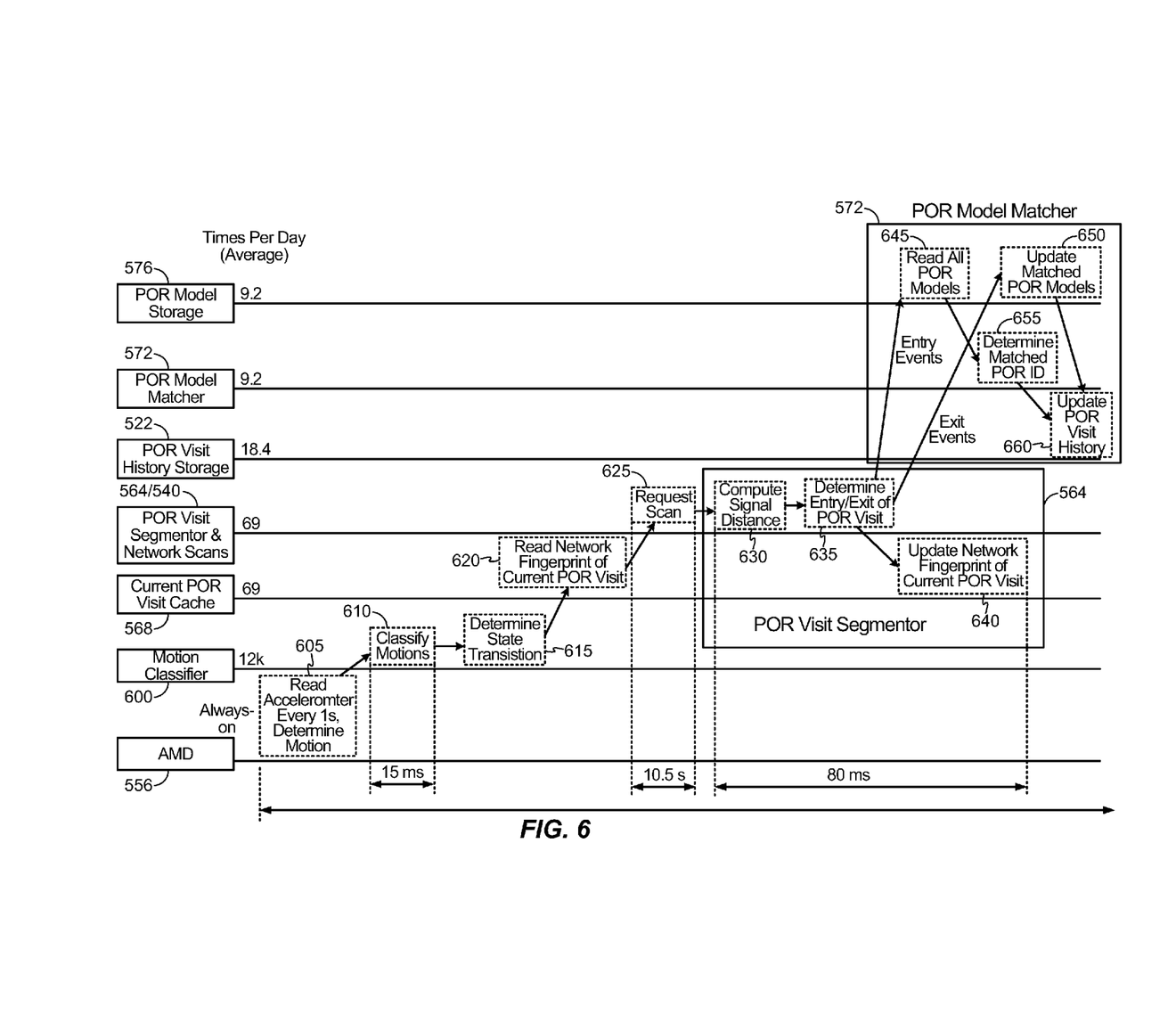
FIG. 6 illustrates an exemplary flow for using motion to optimize PoR operations according to at least one aspect.

FIG. 6 illustrates an exemplary flow for using motion to optimize PoR operations according to at least one aspect. The left side of FIG. 6 shows exemplary average times per day that the various aspects may be performed. At 605, the motion detector 556, which can be always-on, reads the sensor(s) 530, such as an accelerometer, once every second and determines if there is motion. At 610, a motion classifier 600, similar to motion state classification 554, classifies any detected motion, and at 615, determines if there has been a state transition. The classification may take, for example, approximately 15 ms. At 620, the mobile device can read the network fingerprint of the current PoR visit from the current PoR visit cache 568. That is, the current PoR visit cache 568 can provide the list of available local wireless networks for the given PoR.

At 625, the PoR visit segmentor 564 and local wireless network access subsystem 540 request and perform a scan for available local wireless networks. As an example, this may take approximately 10.5 seconds. At 630, the PoR visit segmentor 564 computes the signal distance of the detected local wireless networks. At 635, the PoR visit segmentor 564 determines an entry or exit event for the PoR visit. At 640, the PoR visit segmentor 564 updates the network fingerprint of the current PoR visit in the current PoR visit cache 568. As an example, this processing at the PoR visit segmentor 564 may take approximately 80 ms.

For entry events, at 645, the PoR model matcher 572 can read all the PoR models from the PoR model storage 576. At 655, the PoR model matcher 572 can determine a matched PoR identifier, and at 660, can update the PoR visit history in the PoR visit history storage 522. For exit events, at 650, the PoR model matcher 572 can update any matched PoR models in the PoR model storage 576, and at 660, can update the PoR visit history in the PoR visit history storage 522.

Figure 7:
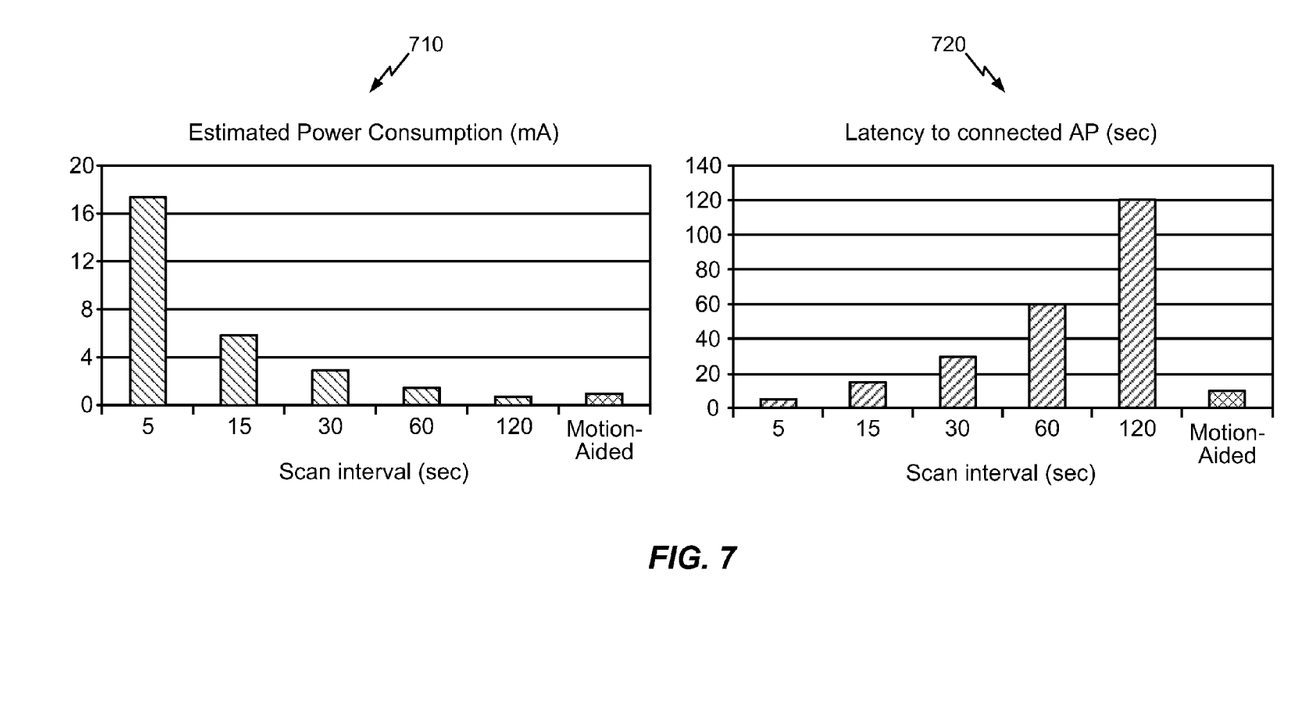
FIG. 7 illustrates exemplary tradeoffs between power and latency for UEs using and not using the various aspects of the disclosure.

FIG. 7 illustrates exemplary tradeoffs between power and latency for mobile devices using and not using the various aspects of the disclosure, given a 10 second interval for reporting motion change events. That is, the motion state of the mobile device is reported every 10 seconds. Graph 710 illustrates the power consumption (in mA) for scan intervals of 5, 15 30, 60, and 120 seconds, as well as the power consumption for a motion-aided interval. Graph 720 illustrates the latency to connect to an access point (in seconds) for scan intervals of 5, 15 30, 60, and 120 seconds, as well as the latency for a motion-aided interval. As can be seen, the motion-aided scan interval has the lowest connection latency for the lowest power consumption.

Figure 8:
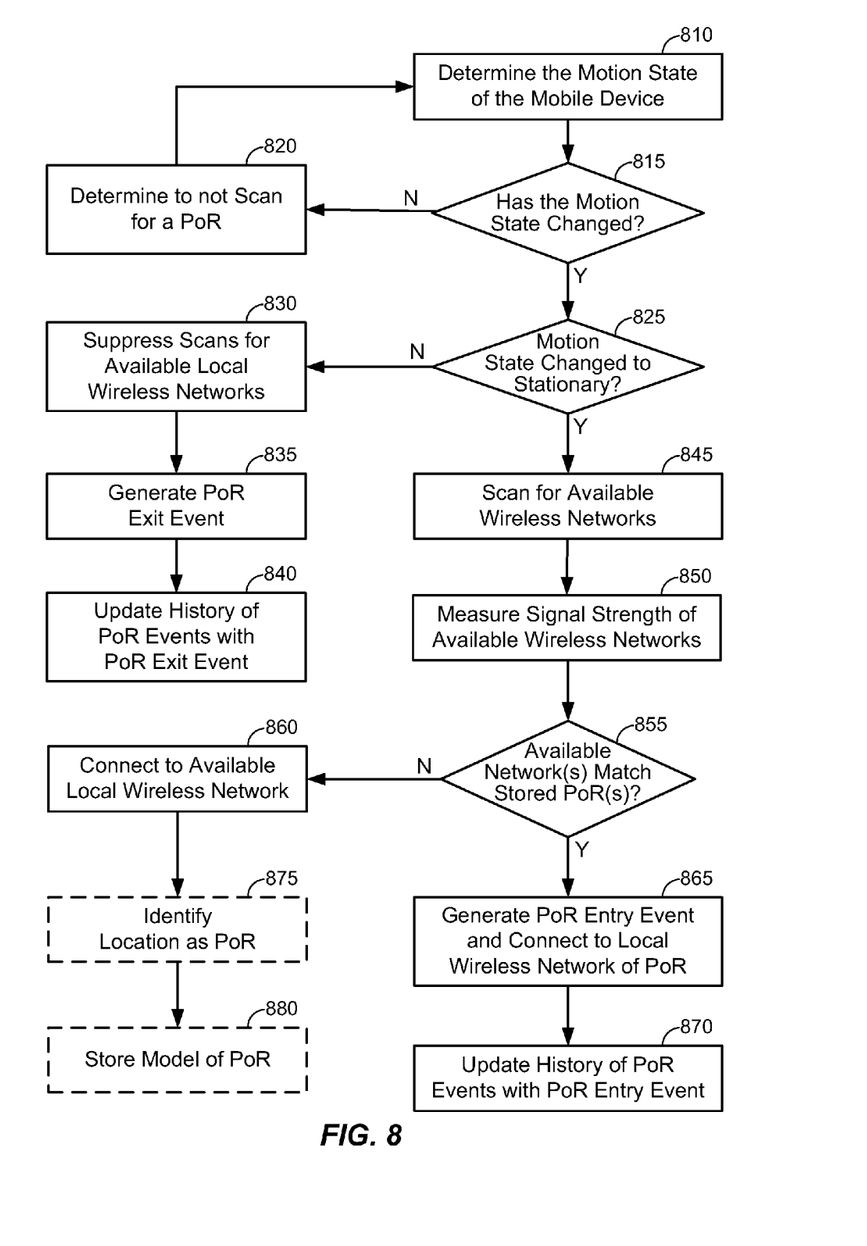
FIG. 8 illustrates an exemplary flow for using motion to optimize PoR detection according to at least one aspect of the disclosure.

FIG. 8 illustrates an exemplary flow for using motion to optimize PoR detection according to at least one aspect of the disclosure. At 810, a mobile device performing the flow determines its motion state. As described above, the motion state may be one of walk, run, sit, stand, fiddle, in-transit, and null. At 815, the mobile device determines whether or not the motion state has changed. If the motion state has not changed, then at 820, the mobile device determines not to trigger a scan for a PoR. If the motion state has changed, then at 825, the mobile device determines whether or not the motion state has changed from a non-stationary motion state to a stationary motion state. If it has not, then at 830, the mobile device determines not to trigger a scan for a PoR. If the mobile device was previously connected to a local wireless network at a PoR, then at 835, the mobile device generates a PoR exit event, and at 840, updates a history of PoR events with the PoR exit event.

If, at 825, the motion state has changed from a non-stationary motion state to a stationary motion state, then at 845, the mobile device scans for available local wireless networks. At 850, the mobile device measures the signal strengths of any detected local wireless networks. At 855, the mobile device determines whether or not the available local wireless networks match a stored model of a PoR. The model may include a "fingerprint" of the PoR, which may include the identities and signal strengths of the local wireless networks available at the PoR, as discussed above. If the mobile device does not identify a stored PoR, then at 860, the mobile device connects to the best available local wireless network. If, however, the mobile device does identify a stored PoR based on the model, then at 865, the mobile device generates a PoR entry event and connects to the local wireless network specified in the PoR model. At 870, the mobile device updates the history of PoR events with the PoR entry event.

If the mobile device connects to a local wireless network at 860, then at 875, the mobile device may optionally identify its current location as a PoR, as is known in the art. At 880, the mobile device optionally stores a model of the PoR for future identification. As discussed above, the model can include a "fingerprint" of the PoR, which may include the identities and signal strengths of the local wireless networks available at the PoR.

In an aspect, a scan can be triggered based on more than simply a motion state change. For example, there could be a minimum period between scans and/or a maximum period between scans. The minimum period would prevent the mobile device from scanning too frequently, while the maximum period would ensure that the mobile device scanned frequently enough. The scan at the maximum period is referred to as a long-interval heartbeat scan, and can be, for example, a scan every 300 seconds.

In an additional aspect, RF information can be used to disable other sensor subsystems when not needed. For example, if the cellular transceiver determines during idle handoff procedures (that occur anyway to enable fast connectivity of a mobile device) that the mobile device is greater than a threshold distance from any local wireless network access points, then the inertial motion tracking can be disabled to save power until needed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for using a change in motion to improve place of relevance (PoR) detection, comprising:
    determining whether or not a motion state of a mobile device has changed from a stationary motion state to a non-stationary motion state or from the non-stationary motion state to the stationary motion state;
    based on the motion state having changed from the stationary motion state to the non-stationary motion state, triggering the mobile device to reduce a rate of scanning for available local wireless networks; and
    identifying a PoR based on the scanning.

2. The method of claim 1, wherein the identifying comprises identifying a previously identified PoR.

3. The method of claim 1, wherein the identifying comprises identifying a new PoR.

4. The method of claim 1, wherein the motion state is one of non-stationary or stationary.

5. The method of claim 4, wherein the motion state of stationary comprises a motion state of sit, stand, fiddle, or absolute rest.

6. The method of claim 4, wherein the motion state of non-stationary comprises a motion state of walk, run, or in-transit.

7. The method of claim 1, further comprising:
    based on the motion state having changed from the non-stationary motion state to the stationary motion state, triggering the mobile device to increase a rate of scanning for available local wireless networks.

8. The method of claim 1, wherein the identifying comprises:
    determining signal strengths of the available local wireless networks; and
    matching the available local wireless networks and the signal strengths to a stored fingerprint of the PoR.

9. The method of claim 1, further comprising:
    generating a PoR entry event in response to the identifying; and
    storing the PoR entry event in a database of previous PoR entry and exit events.

10. The method of claim 1, further comprising:
    storing information related to the available local wireless networks as a fingerprint of the PoR.

11. The method of claim 10, wherein the information related to the available local wireless networks comprises information identifying the available local wireless networks and signal strengths of the available local wireless networks.

12. The method of claim 1, wherein triggering the mobile device to reduce the rate of scanning for available local wireless networks comprises determining to not trigger a scan for available local wireless networks.

13. The method of claim 12, further comprising:
    if the mobile device was at the PoR before the motion state change, generating a PoR exit event based on the stationary motion state changing to the non-stationary motion state.

14. The method of claim 13, further comprising:
    storing the PoR exit event in a database of previous PoR entry and exit events.

15. The method of claim 1, further comprising:
periodically performing a long-interval heartbeat scan for an available local wireless network.

16. The method of claim 15, wherein the long-interval heartbeat scan comprises a scan for an available local wireless network every 300 seconds.

17. The method of claim 1, wherein the stationary motion state or the non-stationary motion state is determined based on data obtained from an accelerometer.

18. An apparatus for using a change in motion to improve place of relevance (PoR) detection, comprising:
logic configured to determine whether or not a motion state of a mobile device has changed from a stationary motion state to a non-stationary motion state or from the non-stationary motion state to the stationary motion state;
logic configured to trigger the mobile device to reduce a rate of scanning for available local wireless networks based on the motion state having changed from the stationary motion state to the non-stationary motion state; and
logic configured to identify a PoR based on the scanning.

19. The apparatus of claim 18, wherein the logic configured to identify comprises logic configured to identify a previously identified PoR.

20. The apparatus of claim 18, wherein the logic configured to identify comprises logic configured to identify a new PoR.

21. The apparatus of claim 18, further comprising:
logic configured to trigger the mobile device to increase the rate of scanning for available local wireless networks based on the motion state having changed from the non-stationary motion state to the stationary motion state.

22. The apparatus of claim 18, wherein the logic configured to trigger the mobile device to reduce the rate of scanning for available local wireless networks comprises:
logic configured to determine to not trigger a scan for available local wireless networks.

23. The apparatus of claim 18, further comprising:
logic configured to periodically perform a long-interval heartbeat scan for an available local wireless network.

24. The apparatus of claim 18, wherein the stationary motion state or the non-stationary motion state is determined based on data obtained from an accelerometer.

25. An apparatus for using a change in motion to improve place of relevance (PoR) detection, comprising:
means for determining whether or not a motion state of a mobile device has changed from a stationary motion state to a non-stationary motion state or from the non-stationary motion state to the stationary motion state;
means for triggering the mobile device to reduce a rate of scanning for available local wireless networks based on the motion state having changed from the stationary motion state to the non-stationary motion state; and
means for identifying a PoR based on the scanning.

26. The apparatus of claim 25, wherein the means for identifying comprises means for identifying a previously identified PoR.

27. The apparatus of claim 25, wherein the means for identifying comprises means for identifying a new PoR.

28. The apparatus of claim 25, further comprising:
means for triggering the mobile device to increase the rate of scanning for available local wireless networks based on the motion state having changed from the non-stationary motion state to the stationary motion state.

29. The apparatus of claim 25, wherein the means for triggering the mobile device to reduce the rate of scanning for available local wireless networks comprises:
means for determining to not trigger a scan for available local wireless networks.

30. The apparatus of claim 25, further comprising:
means for periodically performing a long-interval heartbeat scan for an available local wireless network.

31. The apparatus of claim 25, wherein the stationary motion state or the non-stationary motion state is determined based on data obtained from an accelerometer.

32. A non-transitory computer-readable medium for using a change in motion to improve place of relevance (PoR) detection, comprising:
at least one instruction to determine whether or not a motion state of a mobile device has changed from a stationary motion state to a non-stationary motion state or from the non-stationary motion state to the stationary motion state;
at least one instruction to trigger the mobile device to reduce a rate of scanning for available local wireless networks based on the motion state having changed from the stationary motion state to the non-stationary motion state; and
at least one instruction to identify a PoR based on the scanning.

33. The non-transitory computer-readable medium of claim 32, wherein the at least one instruction to identify comprises at least one instruction to identify a previously identified PoR.

34. The non-transitory computer-readable medium of claim 32, wherein the at least one instruction to identify comprises at least one instruction to identify a new PoR.

35. The non-transitory computer-readable medium of claim 32, further comprising:
at least one instruction to trigger the mobile device to increase the rate of scanning for available local wireless networks based on the motion state having changed from the non-stationary motion state to the stationary motion state.

36. The non-transitory computer-readable medium of claim 32, wherein the at least one instruction to trigger the mobile device to reduce the rate of scanning for available local wireless networks comprises:
at least one instruction to determine to not trigger a scan for available local wireless networks.

37. The non-transitory computer-readable medium of claim 32, further comprising:
at least one instruction to periodically perform a long-interval heartbeat scan for an available local wireless network.

38. The non-transitory computer-readable medium of claim 32, wherein the stationary motion state or the non-stationary motion state is determined based on data obtained from an accelerometer.

* * * * *